Patented May 29, 1945

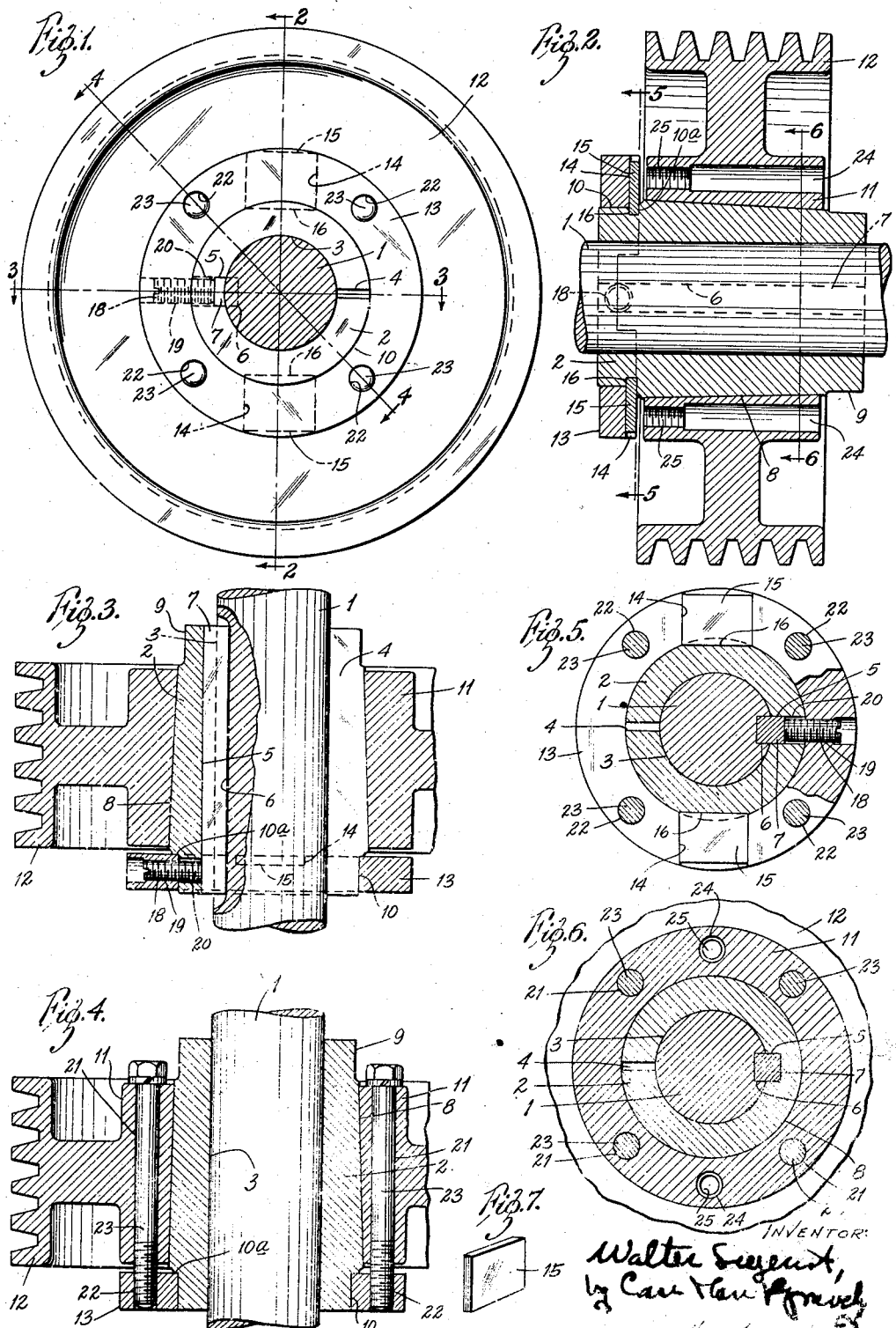

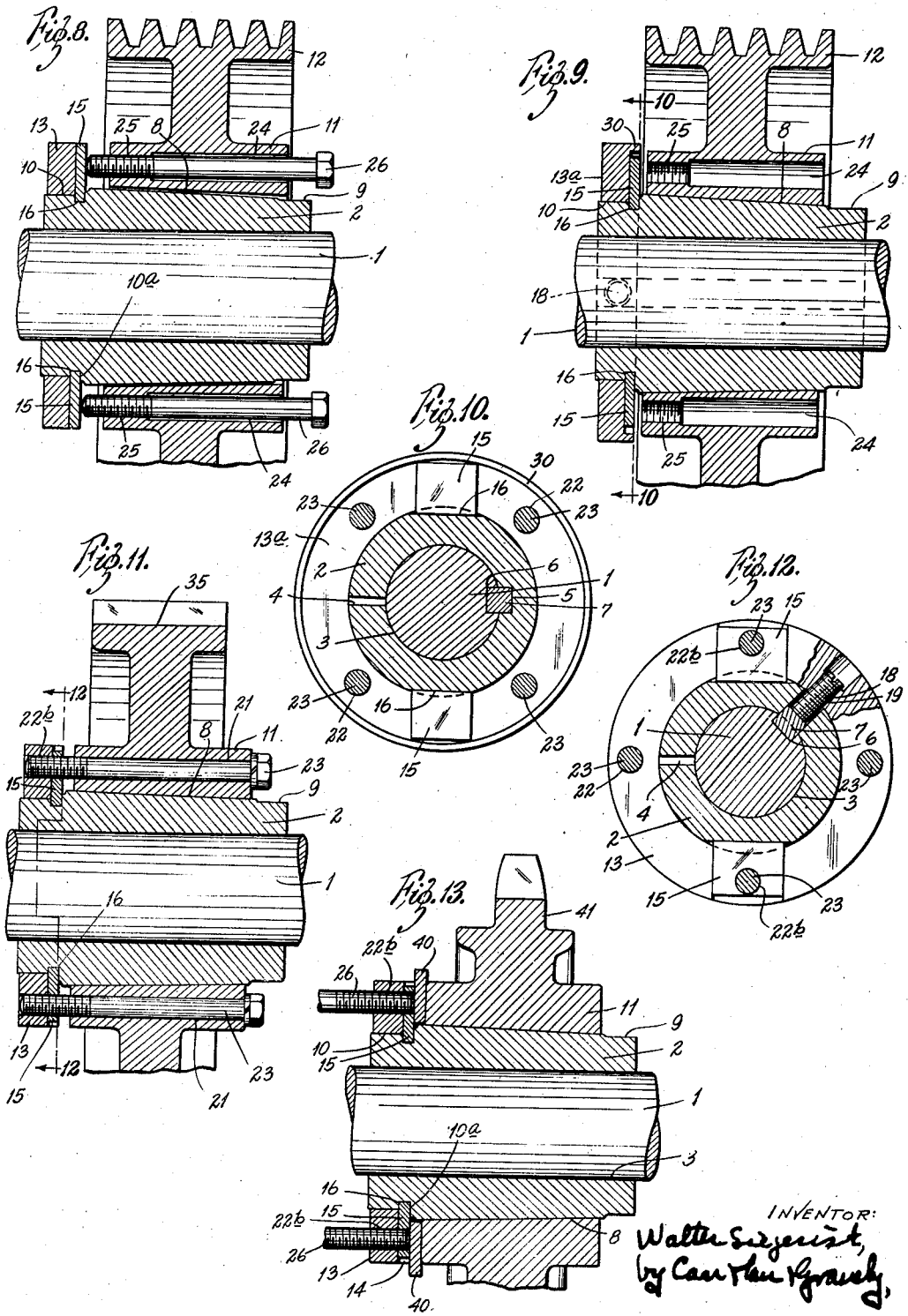

2,377,046

UNITED STATES PATENT OFFICE 2,377,046

MOUNTING FOR SHEAVES AND THE LIKE

Walter Siegerist, University City, Mo.

Application February 23, 1944, Serial No. 523,553

9 Claims. (Cl. 287—52.06)

My invention relates to the mounting of sheaves, gears, sprocket wheels and other rotary power transmission members on their shafts.

A common mounting means for such members includes a bushing having a tapered seat to fit within the tapered bore of said member and having a peripheral flange, adjacent to the large end of said seat, said flange having threaded holes to receive the threaded ends of screws passing through plain holes in the hub of said member, the bushing and flange being longitudinally split, whereby said member may be drawn tight on the tapered seat portion of the bushing and whereby the bushing itself may be contracted against the shaft. The shaft and the bushing are provided with keyways in which is inserted a key, for the transmission of torque and driving force between the bushing and the shaft.

My invention has for its principal objects to facilitate the operation of contracting said bushing, to equalize the contraction throughout the length of the bushing, to relieve said screws of bending stresses and to provide for proper seating of the sheave or other member on the bushing. Other objects are to permit the mak'ng of the bushing proper and the sheave securing flange of different materials, best suited for their particular functions, to provide a securing flange strong in tension and to eliminate the split in said securing flange. Other objects and advantages will appear hereinafter.

The invention consists principally in a mounting bushing for the purpose above described having end portions of substantially equal section and in a continuous ring constituting the securing flange for the sheave or the like mounted on said bushing adjacent to the large end of the tapered seat. The invention also consists in securing said ring on said bushing by means of keys projecting from the ring into recesses in the surface of the bushing. The invention further consists in the mounting for sheaves and the like and in the parts and combinations and arrangements of parts hereinafter described and claimed.

In the accompanying drawings, wherein like reference characters indicate like parts wherever they occur, Fig. 1 is an end elevation of a sheave provided with a mounting embodying my invention, Fig. 2 is a longitudinal sectional view on the line 2—2 in Fig. 1, Fig. 3 is a sectional view on the line 3—3 in Fig. 1, Fig. 4 is a sectional view on the line 4—4 in Fig. 1, Fig. 5 is a cross-sectional view on the line 5—5 in Fig. 2, Fig. 6 is a cross-sectional view on the line 6—6 in Fig. 2, Fig. 7 is a perspective view of one of the locking keys for securing said ring on said bushing, Fig. 8 is a longitudinal sectional view, similar to Fig. 2, showing the use of screws to remove the sheave from the bushing and showing a modified mounting of the locking keys, Fig. 9 is a sectional view, similar to Fig. 2, showing a modification of the ring and locking key arrangement, Fig. 10 is a cross-sectional view on the line 10—10 in Fig. 9, Fig. 11 is a longitudinal sectional view similar to Fig. 2, showing a modified ring, locking key and locking screw arrangement, Fig. 12 is a cross-sectional view on the line 12—12 in Fig. 11; and Fig. 13 is a sectional view similar to Fig. 11, showing a modified demounting screw arrangement.

In Fig. 1 is illustrated a shaft 1, as a motor shaft, on which is mounted a bushing 2 that is split longitudinally from end to end. The bore 3 of said bushing, preferably opposite the split 4, is provided with a longitudinal keyway 5 and the shaft is provided with a longitudinal keyway 6, the bushing and shaft being secured together for the transmission of the driving torque by a key 7 inserted in the alined keyways 5 and 6.

The bushing 2 is provided with a tapered body or seat 8 extending throughout most of its length, a cylindrical portion 9 projecting from the small end of said tapered portion and a cylindrical portion 10 extending beyond the large end of said tapered portion being of substantially the same section. The hub 11 of a sheave 12 has a tapered bore fitting on the tapered seat of said bushing.

Mounted on the cylindrical portion 10 of said bushing projecting beyond the large end of the tapered seat 8 is a continuous ring 13. Said projection 10 has a shoulder 10a against which said ring 13 abuts. Said ring has slots 14 or ways on the face adjacent to said tapered seat disposed diametrically in alinement with each other. Mounted in each slot 14 is a key 15 that projects into a slot or recesses 16 provided in the surface of the end portion of said bushing at the base of said shoulder 10a, said recesses 16 and said slots 14 being disposed at right angles to the shaft 1. Said keys 15 are secured to said ring, preferably by a suitable welding operation. This connection between the ring 13 and bushing 2 permits contraction and expansion of the bushing without affecting the driving connection and without affecting the position of the ring 13 itself with reference to the sheave 12 or other member mounted thereon. Said keys 15 assist in transmitting driving torque in addition to securing said ring 13 and bushing 2 together.

In assembling the device, the bushing 2, with the ring 13 sleeved thereover and the keys 15 welded to said ring, is placed on the shaft 1 with the bushing keyway 5 alined with the shaft keyway 6, and the bushing is moved to proper position and the key 7 is inserted. A set screw 18 extending through a threaded hole 19 in said ring and an alining larger plain hole 20 in said bushing engages the key 7 to hold the parts in proper position. The hub 11 of the sheave 12 is then placed on the tapered seat.

The hub 11 of the sheave 12 has plain holes 21 extending therethrough parallel to the axis of the shaft 1 and said ring 13 has threaded holes 22 also parallel to said axis. The hub holes 21 and ring holes 22 are brought into alinement and the hub 11 is drawn tight on the bushing 2 by means of cap screws 23 extending through the hub holes 21 and the ring holes 22. The bushing 2 may contract within the hub 11 of the sheave 12 without bending said screws 23 and without affecting the proper seating of the hub on the tapered seat of the bushing.

Said hub 11 may also be provided with holes 24 parallel to said shaft axis and alining with said locking keys 15, the portions 25 of said holes adjacent to said keys being threaded, whereby jack screws 26 may be mounted in said holes and brought into engagement with said keys 15 so as to demount said sheave from the seat, as shown in Fig. 8.

In said Fig. 8 the keys 15 are shown as welded against the flat face of the ring 13, the slots 14 being dispensed with.

In the modification shown in Figs. 9 and 10 also, the slots or keyways in the ring 13a are dispensed with. Said ring 13a has a protecting flange 30 around its outer periphery overhanging the outer ends of the keys 15. In this arrangement, the keys must be inserted in the bushing recesses 16 before the ring 13a is brought into final position on the projecting portion of the bushing. The overhanging flange 30 serves to position the keys 15 during the welding operation as well as to protect them in service.

In the modification shown in Figs. 11 and 12, the threaded openings 22b for the securing screws extend through said keys 15 as well as through said ring 13. This strengthens the connection between the hub, ring and bushing. In this modification, a gear 35 is shown, instead of a sheave.

Except where other parts interfere, as where the sheave is immediately next to a motor or other member, an alternative demounting method is possible as shown in Fig. 13. In this method, securing screws are removed and backing plates 40 inserted between the ring 13 and the hub 11. The screws may then be screwed into the holes in the ring or ring and keys and against said plates to demount the hub. In Fig. 13, a sprocket wheel 41 is shown. The bushing and the ring may be made of different materials, best suited for the requirements of the two members. Preferably, the ring is made of steel and the bushing of cast iron. The steel is very strong in tension and resistant to impact. Cast iron is entirely suitable for the bushing itself.

The above described construction has important advantages. It facilitates the assembling and demounting of the sheave or other member on the bushing. It provides even contraction and expansion of the bushing throughout its length. It eliminates any bending action on the sheave securing screws and it assures proper seating of the hub of the sheave or other member on the tapered seat. The locking and driving or torque-transmitting keys serve to securely fasten the ring and the bushing together and also assist in transmitting driving torque and protect the set screw 18.

Obviously, the locking and driving keys 15 may be dispensed with in the case of smaller gears and the like and numerous other changes may be made without departing from the invention and I do not wish to be limited to the precise construction shown.

What I claim is:

1. A mounting for sheaves and the like comprising a shaft, a longitudinally slitted bushing mounted on said shaft and having a tapered seat for the hub of a sheave or the like, said shaft and bushing having keyways, a key in said keyways for securing shaft and bushing against relative rotation, a continuous ring mounted on said bushing adjacent to one end of said seat, said bushing having a radial plain hole communicating with the keyway therein, said ring having a radial threaded hole alining with said bushing hole, a set screw in said threaded hole extending through said plain hole and engaging said key, said plain hole in said bushing being larger in diameter than the portion of said screw passing therethrough and means securing said hub to said ring.

2. A mounting for sheaves and the like comprising a longitudinally slitted cast iron bushing having a longitudinal keyway diametrically opposite said slit and a tapered seat for the hub of a sheave or the like, a continuous ring of material strong in tension mounted on said bushing adjacent to one end of said seat, a key in said keyway, means securing said key axially relative to said ring and means securing said hub to said ring.

3. A mounting for sheaves and the like comprising a longitudinally slitted bushing having a tapered seat for the hub of a sheave or the like, a continuous ring mounted on said bushing adjacent to one end of said seat, keys welded to said ring and seated in recesses provided therefor in said bushing to secure said ring and bushing together while permitting compression and expansion of said bushing, and means securing said hub to said ring.

4. A mounting for sheaves and the like comprising a shaft, a longitudinally slitted bushing mounted on said shaft and having a tapered seat for the hub of a sheave or the like, said shaft and bushing having keyways, a key in said keyways for securing shaft and bushing against relative rotation, and a cylindrical portion projecting beyond the large end of said tapered seat, a continuous ring mounted on said cylindrical projecting portion of said bushing, said bushing having a radial plain hole communicating with the keyway therein, said ring having a radial threaded hole alining with said bushing hole, a set screw in said threaded hole extending through said plain hole and engaging said key, said plain hole in said bushing being larger in diameter than the portion of said screw passing therethrough and means securing said hub to said ring.

5. A mounting for sheaves and the like comprising a longitudinally slitted bushing having a tapered seat for the hub of a sheave or the like, a continuous ring mounted on said bushing adjacent to one end of said seat, keys welded to said ring and seated in recesses provided therefor in said bushing to secure them together while permitting compression and expansion of said bushing, said ring and said keys having alining threaded openings and screws threaded into said openings for securing said hub to said ring.

6. A mounting for sheaves and the like comprising a longitudinally slitted bushing having a tapered seat for a sheave or the like and a cylindrical portion projecting beyond the large end of said tapered seat, a continuous ring mounted on said cylindrical projecting portion of said bushing, keys projecting from said ring into recesses provided therefor in said bushing and means securing said sheave to said ring.

7. A mounting for sheaves and the like comprising a longitudinally slitted bushing having a tapered seat for a sheave or the like, a continuous ring mounted on said bushing adjacent to one end of said seat and keys welded to said ring and seated in recesses provided therefor in said bushing to secure them together while permitting compression and expansion of said bushing, said ring and keys having alining threaded openings for cooperation selectively with screws for securing said sheave in place and for removing it.

8. A mounting for sheaves and the like comprising a longitudinally slitted bushing having a tapered seat for a sheave or the like and a cylindrical portion projection beyond the large end of said tapered seat, said cylindrical portion having diametrally opposite recesses in its surface adjacent to said tapered seat, a continuous ring mounted on said cylindrical projecting portion of said bushing, said ring having diametrically alined keyways, keys disposed in said keyways and welded to said ring, with their ends projecting into said recesses, thereby securing said ring on said bushing while permitting contraction and expansion of said bushing in said ring and means securing said sheave to said ring.

9. A mounting for sheaves and the like comprising a longitudinally slitted bushing having a tapered seat for a sheave or the like and a cylindrical portion projecting beyond the large end of said tapered seat, said cylindrical portion having diametrically opposite transverse recesses in its surface adjacent to said tapered seat, a continuous ring mounted on said cylindrical projecting portion of said bushing, said ring having a flange around its outer periphery facing said seat on said bushing, keys welded to the face of said ring facing said seat and projecting into said bushing recesses, thereby securing said ring on said bushing and means securing said sheave to said ring.

WALTER SIEGERIST.